(12) United States Patent
Gordon et al.

(10) Patent No.: US 8,107,682 B2
(45) Date of Patent: **\*Jan. 31, 2012**

(54) MOTION CAPTURE USING PRIMARY AND SECONDARY MARKERS

(75) Inventors: Demian Gordon, Culver City, CA (US); Dennis J. Hauck, Jr., Hermosa Beach, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/754,321

(22) Filed: Apr. 5, 2010

(65) Prior Publication Data

US 2010/0188401 A1    Jul. 29, 2010

Related U.S. Application Data

(63) Continuation of application No. 11/467,494, filed on Aug. 25, 2006, now Pat. No. 7,720,259.

(60) Provisional application No. 60/711,923, filed on Aug. 26, 2005, provisional application No. 60/711,905, filed on Aug. 26, 2005.

(51) Int. Cl.
*G06K 9/00* (2006.01)

(52) U.S. Cl. .................................... 382/103; 348/169

(58) Field of Classification Search .................. 382/103, 382/154; 348/169; 345/419, 473
See application file for complete search history.

(56) References Cited

U.S. PATENT DOCUMENTS

| | | | |
|---|---|---|---|
| 5,550,928 A | 8/1996 | Lu et al. | |
| 5,828,770 A | 10/1998 | Leis et al. | |
| 6,061,644 A * | 5/2000 | Leis | 702/153 |
| 6,144,366 A | 11/2000 | Numazaki et al. | |
| 6,973,202 B2 | 12/2005 | Mostafavi | |
| 7,277,601 B2 | 10/2007 | Zorab et al. | |
| 7,720,259 B2 * | 5/2010 | Gordon et al. | 382/103 |
| 2004/0005004 A1 | 1/2004 | Demos | |
| 2006/0055699 A1 | 3/2006 | Pearlman et al. | |

OTHER PUBLICATIONS

Office Action issued in U.S. Appl. No. 11/467,503 on Dec. 9, 2008.
Daisaku Arita et al., "RPV-II: A Stream-Based Real-Time Parallel Vision System and Its Application to Real-Time Volume Reconstruction", Proceedings of the Second International Workshop on Computer Vision Systems, p. 174-189, Jul. 7-8, 2001, figures 1, 3, 4, 8, and pp. 175, 178, 179, 181, 184, and 185.

(Continued)

*Primary Examiner* — John Strege
(74) *Attorney, Agent, or Firm* — Samuel S. Lee; Procopio, Cory, Hargreaves & Savitch LLP

(57) ABSTRACT

Capturing the motion of a target. One method includes: coupling a plurality of primary markers to the target; coupling at least one secondary marker to the target; capturing a plurality of primary marker data points, wherein each primary marker data point corresponds to one primary marker of the plurality of primary markers; capturing at least one secondary marker signature, each secondary marker signature corresponding to and uniquely identifying each secondary marker of said at least one secondary marker; and identifying the plurality of primary markers using said at least one secondary marker signature.

34 Claims, 10 Drawing Sheets

OTHER PUBLICATIONS

L. Herda et al., "Using Skelton-Based Tracking to Increase The Reliability of Optical Motion Capture", Human Movement Science, 2001. http://citeseer.ist.psu.edu/herda01using.html, figures 1a and 1b, abstract, and pp. 1-3 and 19.

Eftychios Sifakis et al., "Automatic Determination of Facial Muscle Activations From Sparse Motion Capture Marker Data", ACM Transactions of Graphics (TOG), v. 24 n. 3, Jul. 2005, figure 1.

Franco, J.-S., et al., "A Distributed Approach for Real Time 3D Modeling", In Proceedings of the IEEE Workshop on Real Time 3D Sensors and Their Use. 2004.

Office Action issued in U.S. Appl. No. 11/467,506 on Sep. 18, 2008.

* cited by examiner 4 x 6 grid 4 x 6 grid

MOTION CAPTURE USING PRIMARY AND SECONDARY MARKERS

CROSS-REFERENCE TO RELATED APPLICATION

This application is a continuation application of U.S. patent application Ser. No. 11/467,494, filed Aug. 25, 2006 now U.S. Pat. No. 7,720,259, which claimed the benefit of priority of U.S. Provisional Patent Application Ser. No. 60/711,923, entitled "Motion Capture Using Active Markers and Passive Markers", and U.S. Provisional Patent Application Ser. No. 60/711,905, entitled "Personal Wearable Digitizer used in Motion Capture", both filed on Aug. 26, 2005. The disclosures of the above-referenced patent applications are incorporated herein by reference.

BACKGROUND

1. Field of the Invention

The present invention relates generally to motion capture, and more particularly, to motion capture using primary and secondary markers to generate three-dimensional graphics and animation.

2. Related Art

Motion capture systems are used to capture the movement of a real object and map it onto a computer generated object as a way of animating it. Such systems are often used in the production of motion pictures and video games for creating a digital representation of a person that is used as source data to create a computer graphics (CG) animation. In a typical system, an actor wears a suit having markers attached at various locations (e.g., having small reflective markers attached to the body and limbs) and digital cameras record the movement of the actor from different angles while illuminating the markers. The system then analyzes the images to determine the locations (e.g., as spatial coordinates) and orientation of the markers on the actor's suit in each frame. By tracking the locations of the markers, the system creates a spatial representation of the markers over time and builds a digital representation of the actor in motion. The motion is then applied to a digital model, which may then be textured and rendered to produce a complete CG representation of the actor and/or performance. This technique has been used by special effects companies to produce highly realistic animations in many popular movies.

An advantage of some motion capture systems over traditional animation techniques, such as keyframing, is the capability of real-time visualization. The production team can review the spatial representation of the actor's motion in real-time or near real-time, enabling the actor to alter the physical performance in order to capture optimal data. Moreover, motion capture systems detect subtle nuances of physical movement that cannot be easily reproduced using other animation techniques, thereby yielding data that more accurately reflect natural movement. As a result, animations using source material collected using a motion capture system will often exhibit a substantially more lifelike appearance.

Conventional methods of capturing motion data may be subject to time-consuming manual steps. For example, some methods utilize markers that are small reflective spheres. Lamps in the capture space illuminate the reflective spheres and cameras capture the resulting reflections. Since the markers are spherical, light from a single lamp can be reflected almost omni-directionally from the hemisphere associated with the incident light, with the result that the reflected light may be captured by many cameras placed in a variety of positions in the capture space. In this way, the spatial coordinates of the markers may be determined. Each data point must also be tracked individually from frame to frame to create a motion history with which to effect the desired animation. By the same reason that light thus reflected from spherical markers provide sharp and accurate data points in the capture space, the captured data points are relatively small and so may also be nearly identical in appearance. Distinguishing the individual captured data points can be very difficult and tracking individual data points from frame to frame may thus be greatly complicated. Because automatic tracking methods are problematic when the captured data points (i.e., markers) to be tracked are substantially indistinguishable, lengthy and resource-intensive manual processing may often be required instead to ensure that each captured data point is accurately distinguished and properly associated with itself from frame to frame. Moreover, large numbers of markers may also be required to adequately resolve the motions associated with the vertices of high-resolution 3-D surface meshes representing surfaces of animated CG actors, thus compounding the problems of automatic and manual tracking by sheer volume of data.

Accordingly, what is needed is a method and system that overcomes these significant problems with respect to marker identification and tracking found in the conventional systems.

SUMMARY

Embodiments of the present invention provide for capturing motion using primary and secondary markers in conjunction with motion capture cameras.

In one implementation, a method includes: coupling a plurality of primary markers to a target; coupling at least one secondary marker to the target; capturing a plurality of primary marker data points, wherein each primary marker data point corresponds to one primary marker of the plurality of primary markers; capturing at least one secondary marker signature, each marker signature corresponding to and uniquely identifying each secondary marker of the at least one secondary marker; and identifying the plurality of primary markers using the at least one secondary marker signature.

In another implementation, capturing at least one secondary marker signature includes capturing a unique attribute of the at least one secondary marker.

In still another implementation, the illumination is subject to periodic gating to generate on-states and off-states of the illumination; the reflection of the illumination is captured during an on-state of the illumination; and the unique attribute is captured during an off-state of the illumination. In a further implementation, the reflection of the illumination is captured from light markers; and the unique attribute is captured from dark markers.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
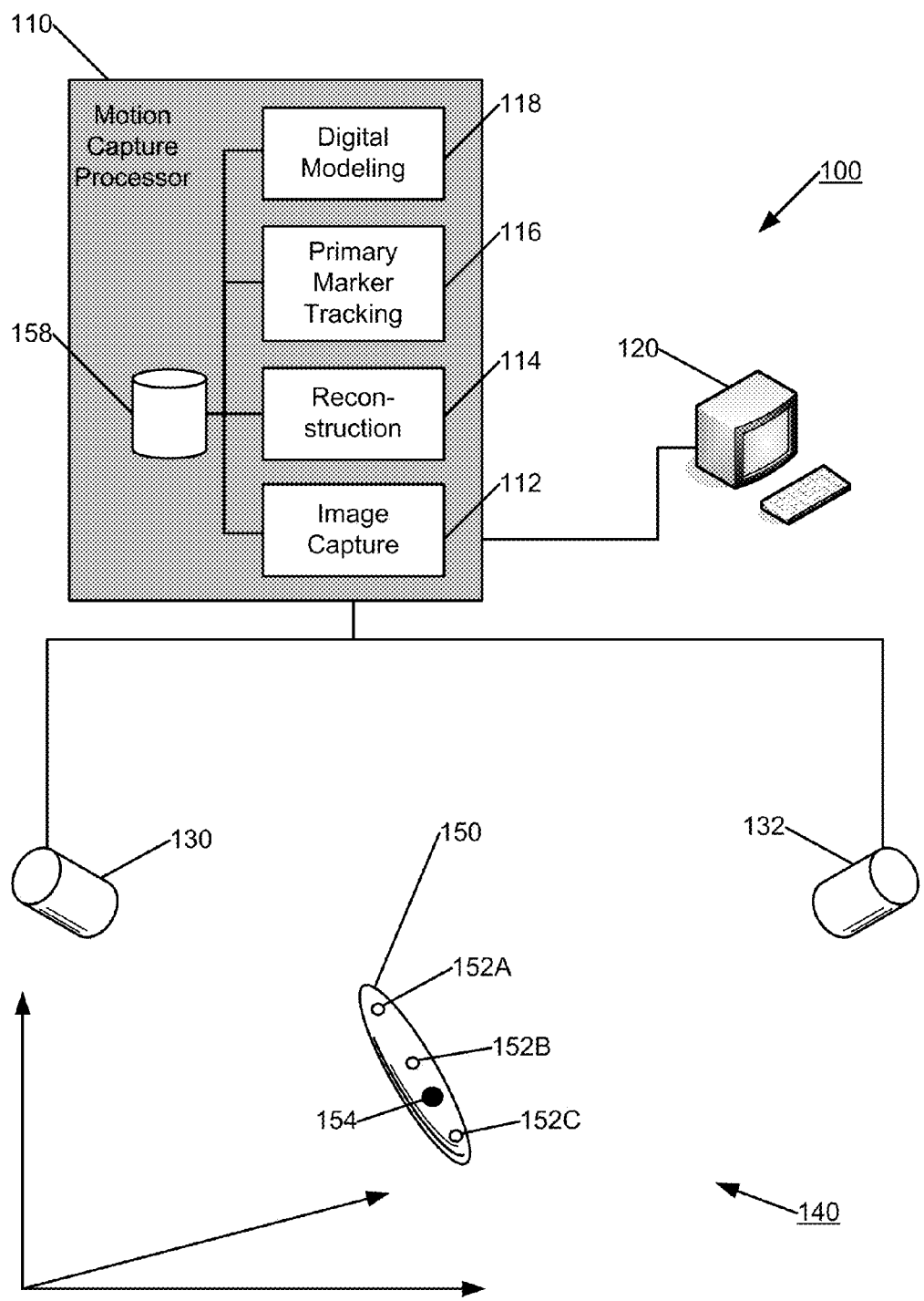
FIG. 1 is a diagram illustrating a system of motion capture according to one embodiment.

As will be further described below, the present invention satisfies the need for a motion capture system that enables more robust tracking of markers from frame to frame. In the detailed description that follows, like element numerals are used to describe like elements illustrated in one or more of the drawings.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Markers are components integral to most forms of motion capture, and comprise two broad categories: active and passive markers. Since the fidelity and resolution of passive markers is greater than other markers, it is preferable to use passive markers in many applications. However, because of the difficulty and manual effort required to process the data in using the passive markers, it is useful to combine the two different types of markers in a hybrid system.

For example, in some implementations, desirable motion capture results can be achieved by using a hybrid system including both active and passive markers. Typically, the passive markers require tracking while the active markers do not require tracking. In other implementations, primary and secondary markers are used in a hybrid system to achieve desirable motion capture results. In these other implementations, the primary markers are markers that require tracking similar to passive markers and the secondary markers are markers that do not require tracking similar to active markers. However, in other implementations, active markers are used as primary markers and passive markers are used as secondary markers.

Active markers are generally characterized by use of a power source to emit energy of some type. Examples of active markers or components include LEDs, active RFID (radio frequency identification) tags, data gloves, potentiometers, accelerometers, externally-worn exoskeleton, and sonic-chirp emitters. Passive markers typically do not require a power source. One example of passive markers or components is the retro-reflective sphere, constituting essentially a small shiny ball that, when bathed in bright light, produces a small, intense dot of light easily captured by optical means. Other examples of passive markers include passive RFID tags, glow-in-the-dark patches, shape tapes, and electro-magnetic tags providing an electro-magnetic signature. A further distinction may be made between "light" and "dark" markers. A retro-reflective sphere, for example, would be characterized as a light marker, and a glow-in-the-dark marker characterized as a dark marker.

Real-time visualization of motion capture data can be derived from the active markers, and then the skeletal data generated by those markers can be used to label the passive marker data generated by the motion capture system. This would result in real-time pre-visualization with substantially reduced manual cleanup in post-processing to generate high-quality optical motion capture data. The hybrid system thus provides both real-time performance and high fidelity of motion.

Referring to FIG. 1, a hybrid motion capture system 100 according to an embodiment of the present invention includes a motion capture processor 110 connected to a user workstation 120. In the embodiment illustrated, the motion capture processor 110 includes an image capture module 112, a reconstruction module 114, a primary marker tracking module 116, a digital modeling module 118, and a storage module 158. Connected to the motion capture processor 110 are two motion capture cameras 130, 132. In one embodiment of the present invention, substantially more than two motion capture cameras are used according to a variety of user and animation-related requirements. The motion capture cameras 130, 132 are focused on a capture space 140 in which a target 150 (shown as an arbitrarily shaped object in FIG. 1) occupies a position defined by spatial coordinates.

As shown in the illustrated embodiment of FIG. 1, the target 150 has coupled to it multiple primary markers 152A-C and one secondary marker 154. The cameras 130, 132 may be controlled by the image capture module 112 to capture frame by frame images of the primary markers 152A-C and secondary marker 154 and pass them to the image capture module 112 of the motion capture processor 110. In one implementation, the cameras 130, 132 capture images of the primary markers 152A-C and secondary marker 154 in alternating image frames. In another implementation, the cameras 130, 132 capture images of the primary markers 152A-C and secondary marker 154 in the same frames. The image frames thus captured may be placed in the storage module 158. Alternatively, or concurrently, the image frames may be viewed in real-time by a user on the workstation 120.

In one implementation, the data from the cameras 130, 132 are captured in collections of data called "beats." A beat corresponds to the data captured over a period of time corresponding to a scene shot, or portion of a scene shot. Each camera 130, 132 may generate a separate file for each beat. Thus, for a single beat, there will be a file for each of one camera 130 and the other camera 132. It will be appreciated that where there is a substantially larger number of cameras 130, 132 in use, each beat will therefore include a correspondingly larger number of separate data files, one for each camera. Further, for each camera 130, 132 there corresponds a body of calibration data including, for example, information as to its 3-D position in the capture space 140, its direction of focus (e.g., the 3-D "ray" along which the camera 130, 132 is focusing), and its current depth of field. It will be appreciated that other items of calibration data may be added or substituted for the example data discussed herein.

In one implementation, the reconstruction module 114 is operable to read in some or all of the files generated for a beat ("beat files"), and corresponding calibration data for the appropriate cameras 130, 132, and fuse the camera data into raw 3-D "point clouds" of unlabeled data. These data may be saved to storage 158, or provided directly to the primary marker tracking module 116.

As explained in more detail below, the primary marker tracking module 116 receives frames of raw 3-D point cloud data, or retrieves the stored frames of point cloud data from the storage module 158. The primary marker tracking module 116 also performs a tracking function on the frames to accurately map the primary markers of each frame with the frames both before and after it, using secondary marker identities as an aid to labeling the individual primary markers from frame to frame. Once labeling is complete, the labeled data are passed to the digital modeling module 118. The digital modeling module 118 creates for each frame a system of vertices in a virtual space, comprising a modeled surface representing the target 150. Because the primary markers 152A-C captured in one frame are properly labeled as the same primary markers 152A-C in a subsequent frame, the primary markers are thus connected from frame to frame and the motion of the modeled surface may be smoothly rendered.

As shown in FIG. 1, according to at least one embodiment of the present invention, the secondary marker 154 may be positioned relatively closely to a particular primary marker 152B. In another implementation, the secondary marker 154 need not be placed closely to any particular primary marker 152A-C. In one implementation, there is a many-to-one correspondence respectively between primary markers 152A-C and a secondary marker 154. The ratio of primary markers 152 to secondary marker 154 may vary from one-to-one to any ratio appropriate for the current implementation. Variations such as these may be implemented by the user to accommodate expected ease or difficulty in mapping (i.e., tracking) the primary markers 152 from one frame to the next. For example, in one implementation, several hundred primary markers are used to capture subtle movements on a human face and body.

Figure 2A:
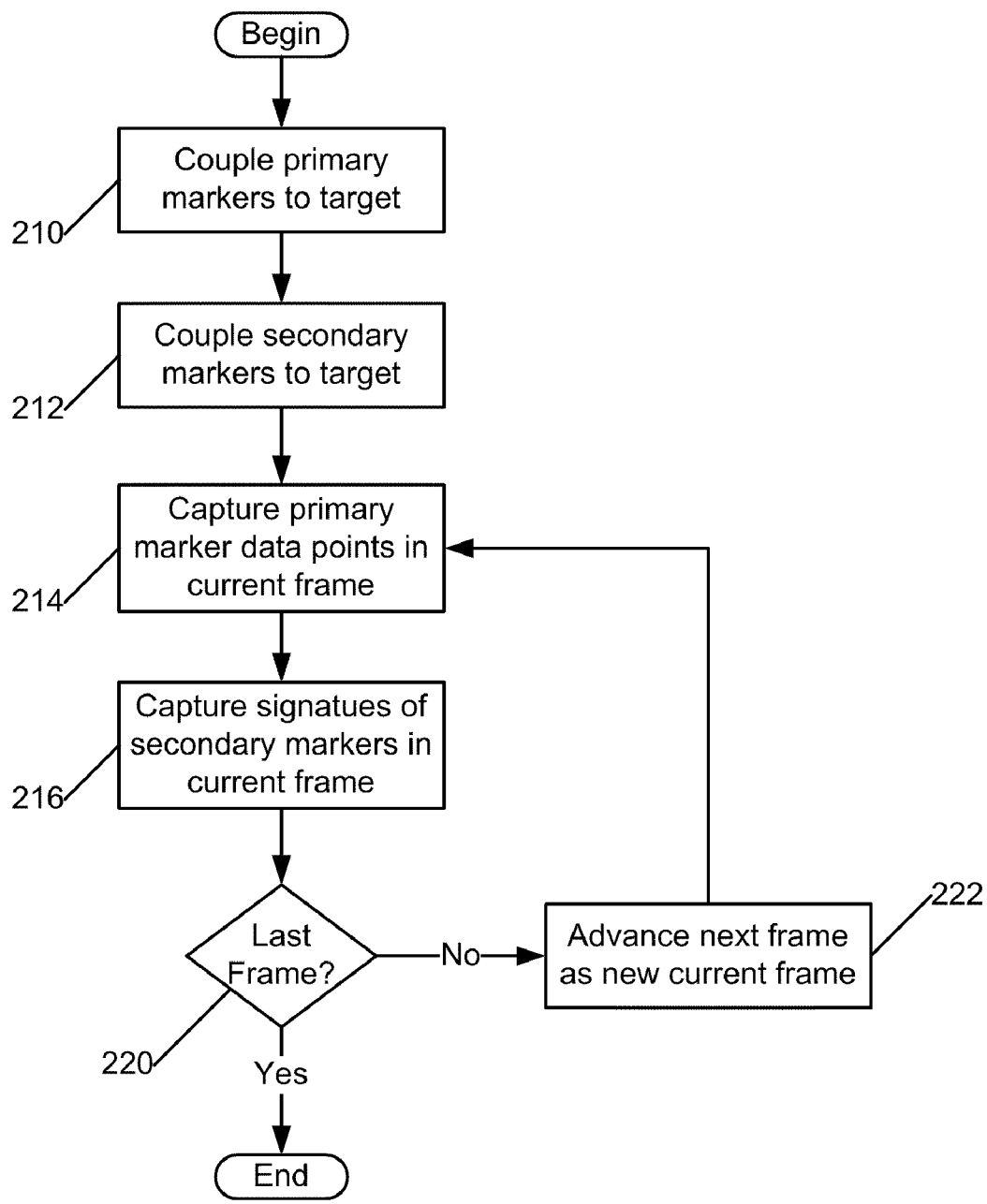
FIG. 2(a) is a flowchart illustrating a method according to one embodiment for capturing primary marker data points and secondary marker signatures.

FIG. 2(a) is a flowchart illustrating a method according to an embodiment for capturing primary marker data points and secondary marker signatures. The method includes coupling primary markers 152 to the target 150, at 210. One or more secondary markers 154 are coupled to the target 150, at 212. In one implementation, coupling, at 210 and 212, includes applying paint or other reflective coating on the target 150. Next, at 214, a current frame is used to capture the primary marker data points. In one implementation, the primary markers 152A are reflective spheres and the illuminated, reflected points on the surfaces of the spheres substantially comprise primary marker data points. That is, one reflection from a primary marker 152A, for example, comprises one primary marker data point. The signatures of the secondary markers 154, including the positions of the secondary marker signatures, are captured, at 216. In one implementation, the primary marker data points and the secondary marker signatures are captured substantially simultaneously.

Typically, secondary markers are substantially uniquely identifiable, and each has a substantially unique signature according to some mode of characterization. For example, in one implementation, a secondary marker is characterized by a shape. In another implementation, a secondary marker is characterized by a color. In another implementation, a secondary marker is characterized by a luminance, such as an intensity at which it glows in the dark. Additionally, a secondary marker can be an active marker, including a visual device such as an LED, and non-visual devices such as a sonic chirp emitter or an active RFID emitter. In yet another implementation, a secondary marker is characterized by any combination of some or all of the above-mentioned passive and active characteristics such as shape, color, luminance, and emission. That is, a secondary marker may be characterized by any uniquely identifiable signature similar to those mentioned above as well as other non-visual characteristics such as RF and electro-magnetic signatures. Moreover, secondary markers of multiple different types may be used simultaneously in a single implementation.

It will be appreciated as well that primary markers may include any of the types of markers discussed above according to user's requirements.

In some implementations, marker pairings, such as primary-secondary, active-passive, and light-dark, are used to distinguish the parts or areas of the subject being captured rather than one providing reference for the other. For example, in one implementation, light markers are used for motion capturing body and dark markers are used for motion capturing face. Thus, in this implementation, the light-dark mark pairing is used to distinguish the captured data points from face and body.

If it is determined, at 220, that the current frame is not the last frame, then the next frame is advanced, at 222, and that frame becomes the new current frame. The method then continues, at 214, by using the new current frame to capture the next set of primary marker data points. The method proceeds as described until the current frame is determined to be the last frame. According to this implementation, primary marker data and secondary marker signatures are thus acquired on a frame-by-frame basis.

Figure 2B:
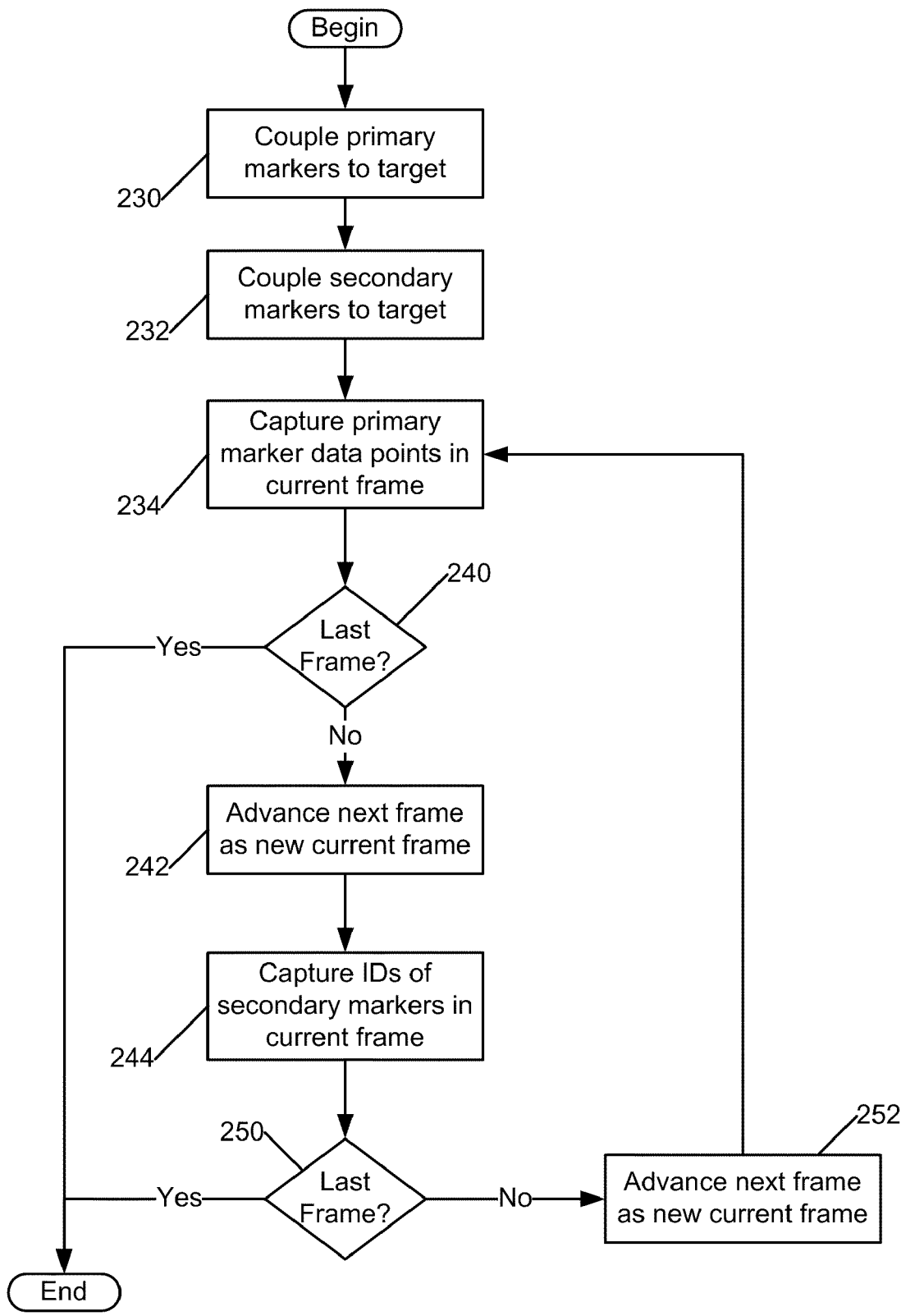
FIG. 2(b) is a flowchart illustrating a method according to one embodiment using alternating frames for capturing primary marker data points and secondary marker signatures.

FIG. 2(b) is a flowchart illustrating a method according to another embodiment for capturing primary marker data points and secondary marker signatures. Similarly to the method illustrated in FIG. 2(a), the method includes coupling primary markers 152 to the target 150, at 230. One or more secondary markers 154 are coupled to the target 150, at 232. At 234, a current frame is used to capture the primary marker data points. Then, at 240, it is determined if the current frame is the last frame. If the current frame is not the last frame, then the next frame is advanced, at 242, as the new current frame. At 244, the signatures of the secondary markers are captured. If it is determined, at 250, that the current frame is not the last frame, then the next frame is advanced, at 252, and becomes the new current frame. The method then continues, at 234, by using the new current frame to capture the next set of primary marker data points. The method proceeds as described until it is determined, at 240, 250, that the current frame is the last frame. According to this implementation, primary marker data and secondary marker signatures are thus acquired on an alternating frame-by-frame basis.

Figure 3A:
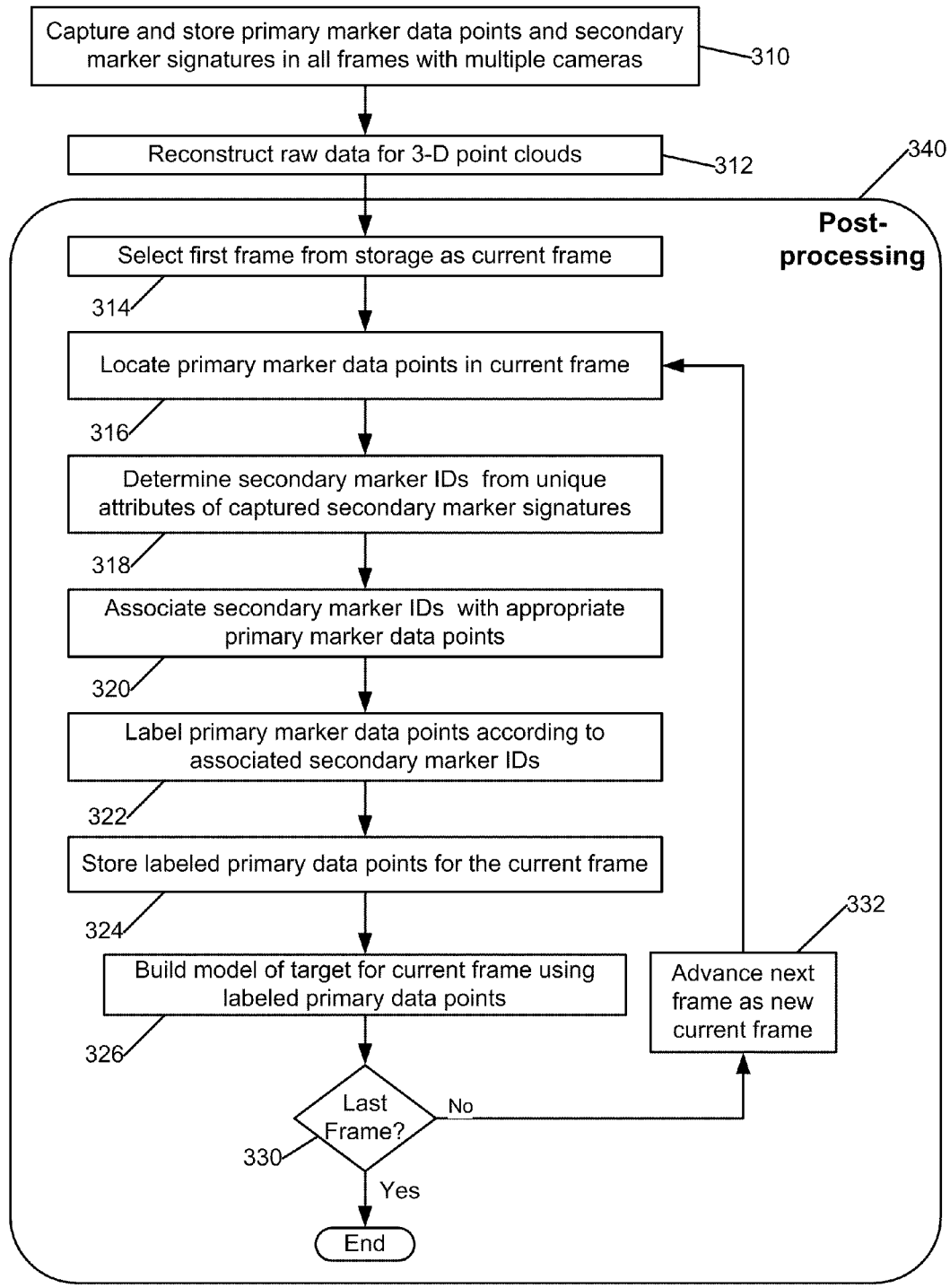
FIG. 3(a) is a flowchart illustrating a method according to one embodiment for using secondary marker identities to label primary markers.

FIG. 3(a) is a flowchart illustrating a method for using secondary marker identities to label primary marker data points according to an embodiment. In one implementation, this method is performed primarily during post processing of data at 340, generally corresponding to the labeling task performed by the primary marker tracking module 116 of FIG. 1. The method illustrated in FIG. 3(a) includes capturing the primary marker data points and secondary marker signatures with the motion capture cameras for the frames under consideration, and storing the captured data points and signatures, at 310. In another implementation, storage of the data thus captured may be concurrent with real-time, or near real-time processing. Alternatively, the captured data may be concurrently stored and processed in real-time or near real-time. Reconstruction is then performed at 312 to create 3-D point clouds of raw data.

Labeling begins with the selection of a first frame, at 314, as the current frame. The primary marker data points in the current frame are located, at 316. Secondary marker identities ("IDs") are determined, at 318, from unique attributes of the captured secondary marker signatures of the frame. Substantially unique secondary marker IDs are possible because the signatures of the secondary markers from which they are derived are themselves substantially uniquely identifiable. For example, in one implementation, secondary markers may include individually unique bar codes. Secondary marker IDs are then associated, at 320, with appropriate primary marker data points. The secondary marker ID provides a unique signature and is thus relatively easily tracked, whereas the primary marker data points alone are difficult to distinguish from each other. In one implementation, the association of a primary marker data point is made according to the spatial proximity of the secondary marker to a primary marker data point. In another implementation, a secondary marker is used as a gross position reference for a group of nearby primary marker data points. The group of substantially individually indistinct primary marker data points can thus be more easily tracked due to the additional location information inferred from the secondary marker ID track. In another implementation, a primary marker data point may be associated with two or more secondary marker IDs corresponding to secondary markers located substantially near the primary marker data point. For example, the two or more secondary marker IDs thus located can also be substantially uniquely identified by an exhibited spatial pattern. It will be appreciated that other options exist for associating one or more primary marker data points with one or more secondary marker IDs, in many-to-one, many-to-many, and one-to-many relationships, both manually and automatically.

Primary marker data points are next uniquely labeled, at 322, according to the one or more associated secondary marker IDs. Additionally, primary marker data points may be labeled according to one or more other primary marker data points already labeled. The labeled primary data points are then stored, at 324, corresponding with the current frame. A virtual model of the target 150 is next built from the primary marker data points, at 326. Alternatively, a primary marker data points can be used to conform an existing model to the target 150. If it is determined, at 326, that this frame is not the last frame under consideration, then the next frame is advanced as the new current frame, at 324. Primary marker data points are then located, at 316, in the new current frame, and the method proceeds as discussed above until the last frame is determined.

Figure 3B:
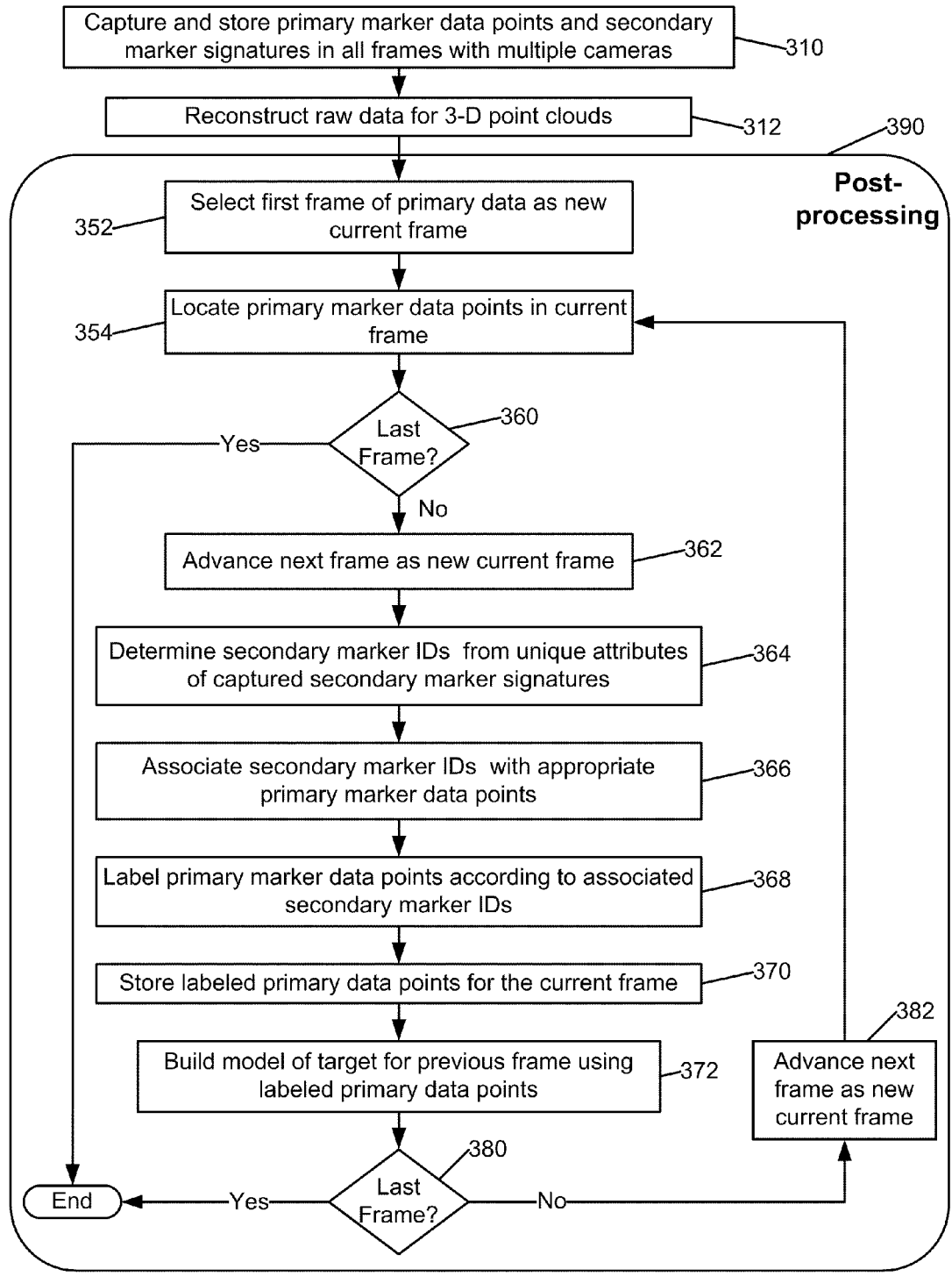
FIG. 3(b) is a flowchart illustrating a method according to one embodiment for using secondary marker identities to label primary markers through the use of alternating frames.

FIG. 3(b) is a flowchart illustrating a method according to another embodiment for using secondary marker identities to label primary markers through the use of alternating frames. In one implementation, this method is performed primarily during post processing 390, which generally corresponds to the tasks performed by the primary marker tracking module 116 of FIG. 1. The method includes capturing and storing the primary marker data points and secondary marker signatures with the motion capture cameras for the frames under consideration, at 310. Reconstruction is then performed at 312 to create 3-D point clouds of raw data.

A first frame is selected as the current frame, at 352. The primary marker data points in the current frame are located, at 354. If it is determined, at 360, that the current frame is not the last frame under consideration, then the next frame is advanced as the new current frame, at 362. Secondary marker identities ("IDs") are determined, at 364, from unique attributes of the captured secondary marker signatures of the frame. Substantially unique secondary marker IDs are possible because the signatures of the secondary markers from which they are derived are themselves substantially uniquely identifiable. Secondary marker IDs are then associated, at 366, with appropriate primary marker data points. In one implementation, the association of a primary marker data point is made according to the spatial proximity of the secondary marker to a primary marker data point. In another implementation, a primary marker data point may be associated with two or more secondary marker IDs corresponding to secondary markers located substantially near the primary marker data point. For example, the two or more secondary marker IDs thus located can also be substantially uniquely identified by the spatial pattern they exhibit. It will be appreciated that many methods exist to associate a primary marker data point with one or more secondary marker IDs. Primary marker data points are then uniquely labeled, at 368, according to one or more secondary marker IDs associated with each primary marker data point. The labeled primary data points are then stored, at 370, corresponding with the current frame. A virtual model of the target 150 is next built, at 372, from the primary marker data points. If it is determined, at 380, that the current frame is not the last frame under consideration, then the next frame is advanced as the new current frame, at 382. Primary marker data points are then located in the new current frame, at 354, and the method proceeds as discussed above until the last frame is determined, at 360, 380.

Figure 4:
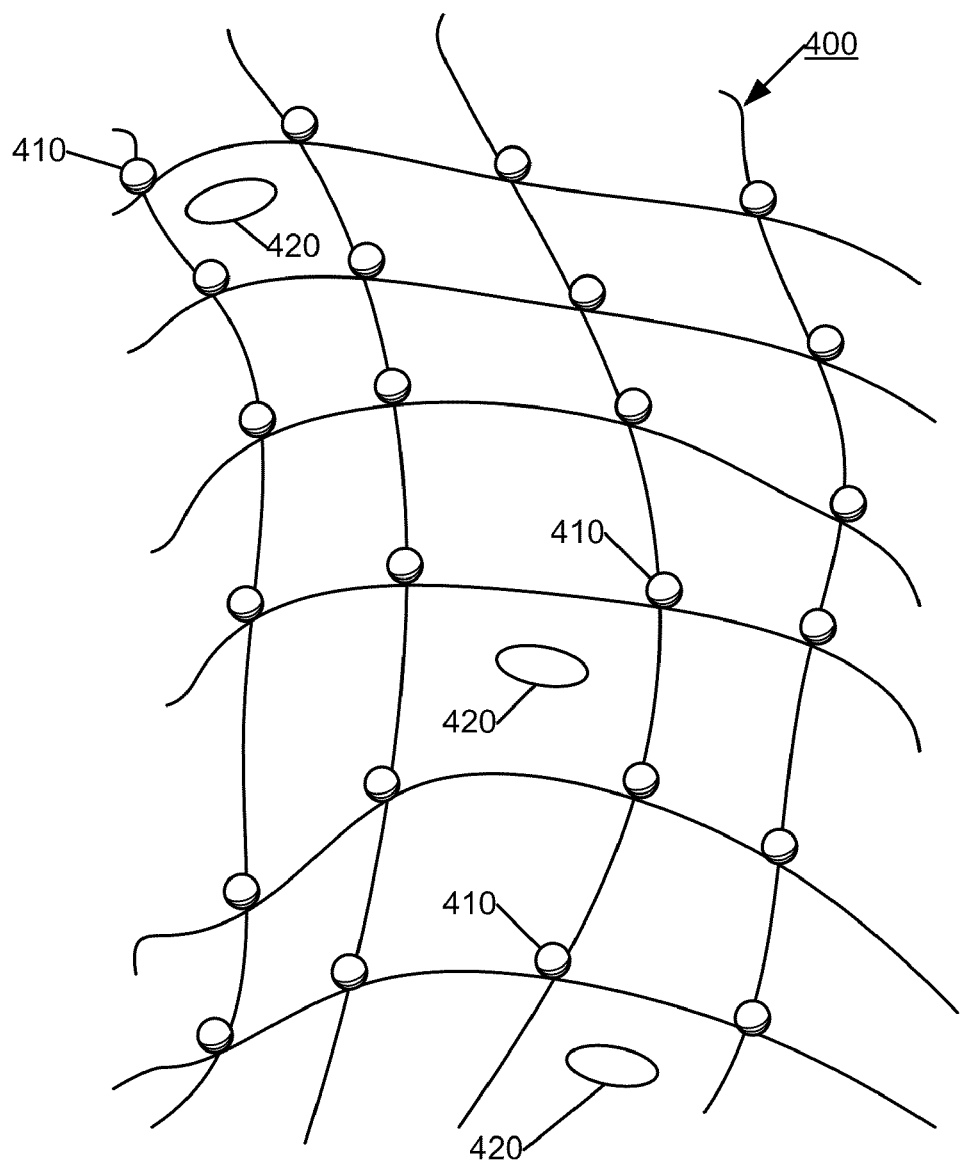
FIG. 4 is a diagram illustrating the physical placement of primary and secondary markers according to an embodiment.

FIG. 4 illustrates the physical placement of primary and secondary markers on a deformable surface according to one embodiment of the present invention. The surface, for example, may be a portion of a body suit worn by an actor in a motion capture sequence. The surface is represented by a deformed grid 400. The vertices of the grid 400 in this implementation define positions at which primary markers 410 are coupled to the surface. In FIG. 4, the twenty-four primary markers shown are substantially identical reflective spheres. For clarity, only three are indexed. Three secondary markers 420 are drawn as identical ellipses. As shown, secondary markers 420 may be located in open areas between primary markers 410 according to a one-to-many correspondence, respectively. Alternatively, secondary markers 420 can be placed in close proximity to a primary marker 410. As discussed in the foregoing, it will be appreciated that the secondary markers 420 include any type or combination of active and passive markers.

In one implementation, the primary markers 410 and secondary markers 420 of a frame are captured, as at 310. By reconstruction, as at 312, raw point clouds in 3-D are produced, representing a fusion of beat files generated by a multiplicity of cameras 130, 132, as discussed above. The 3-D point clouds include the primary data points and secondary marker signatures. In one implementation, secondary marker IDs are determined from the secondary marker signatures (recalling that a secondary marker signature is substantially unique in the population of secondary signatures), and corresponding primary marker data points are associated with secondary marker IDs (at 320) on the basis of closest proximity. That is, a primary marker data point will be assigned a label according to the secondary marker ID of the closest secondary marker 420 to the primary marker 410 from which the primary marker data point was captured. In another implementation, a unique spatial pattern of secondary markers 420 can be created by combining the inherent uniqueness of the secondary markers 420 with their spatial positions. Thus, primary markers may be identified not only according to their positions relative to a single secondary marker 420, but also to a spatial pattern formed of multiple secondary markers 420.

Figure 5:
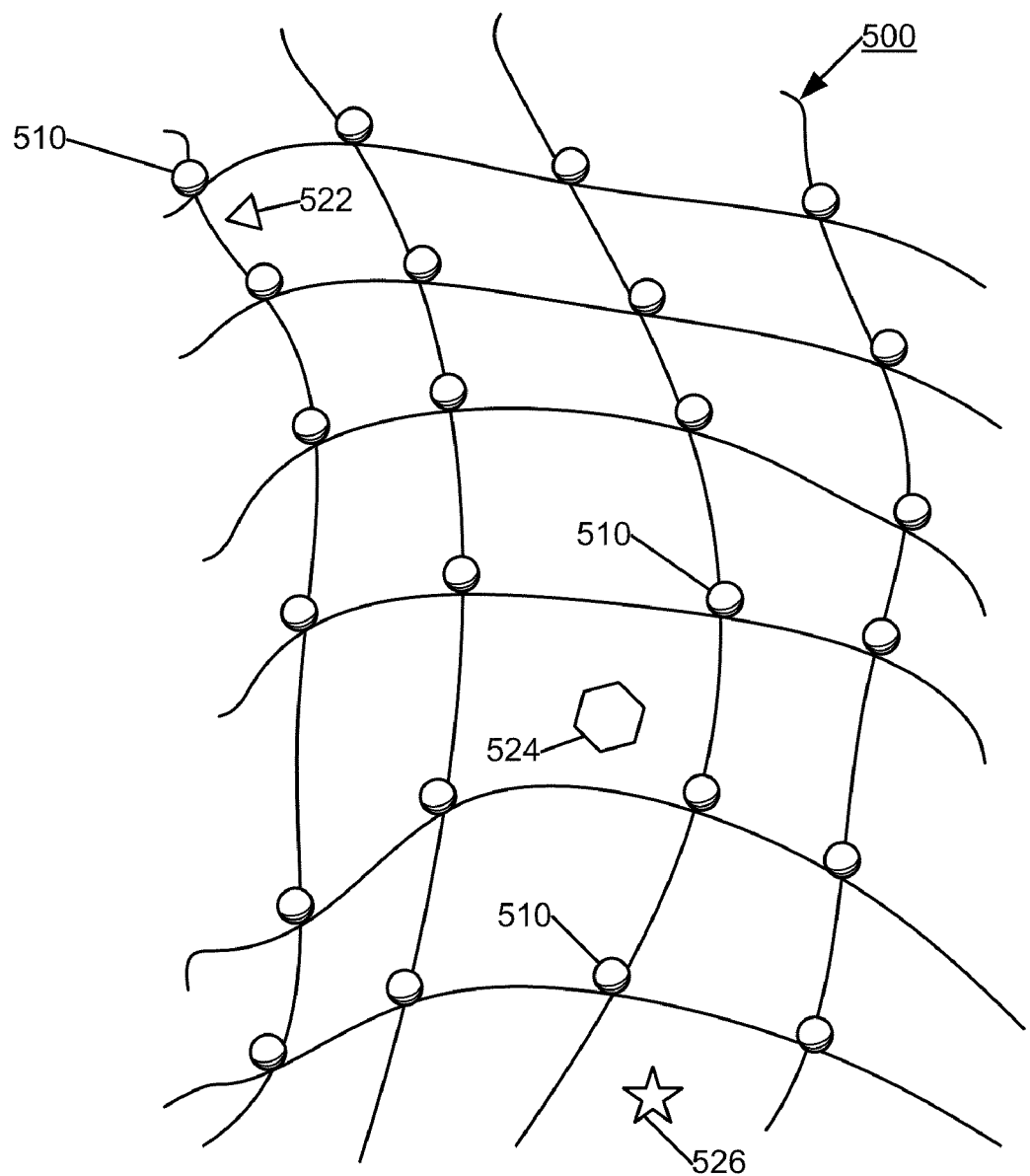
FIG. 5 is a diagram illustrating the physical placement of primary markers and secondary markers with shape attributes according to another embodiment.

In one embodiment, the signature of a secondary marker is provided through the use of a unique shape. FIG. 5 illustrates the physical placement of primary markers 510 and secondary markers 522, 524, 526 with shape attributes according to such an embodiment. Secondary marker 522 is a triangle, marker 524 is a hexagon, and marker 526 is a 5-point star. A surface is represented by a deformed grid 500. The vertices of the grid 500 in this example also define positions at which primary markers 510 are coupled to the surface. As in FIG. 4, twenty-four primary markers are shown as substantially identical reflective spheres. In this example, three secondary markers 522, 524, 526, are placed in areas between primary markers 510. All three secondary markers 522, 524, 526, are uniquely shaped and thus have unique optical signatures.

In one implementation, the primary markers 510 and secondary markers 522, 524, 526 of a frame are captured, as at 310. By reconstruction, as at 312, raw point clouds in 3-D are produced, representing a fusion of beat files generated by a multiplicity of cameras 130, 132, as discussed above. The 3-D point clouds include primary data points corresponding to primary markers 510 and secondary marker signatures corresponding to secondary markers 522, 524, 526. Secondary marker IDs may then be assigned according to the secondary marker unique shape-based optical signatures. Corresponding primary marker data points are then associated with secondary marker IDs (at 320) on the basis of closest proximity. Because the inherent uniqueness of the secondary markers 520, primary markers may be further identified in relation to the unique spatial pattern formed by multiple secondary markers 522, 524, 526. In another implementation, the secondary markers 522, 524, 526 in use are not substantially unique individually, but yet form substantially locally unique patterns in relation to which primary markers 510 may be labeled.

Figure 6:
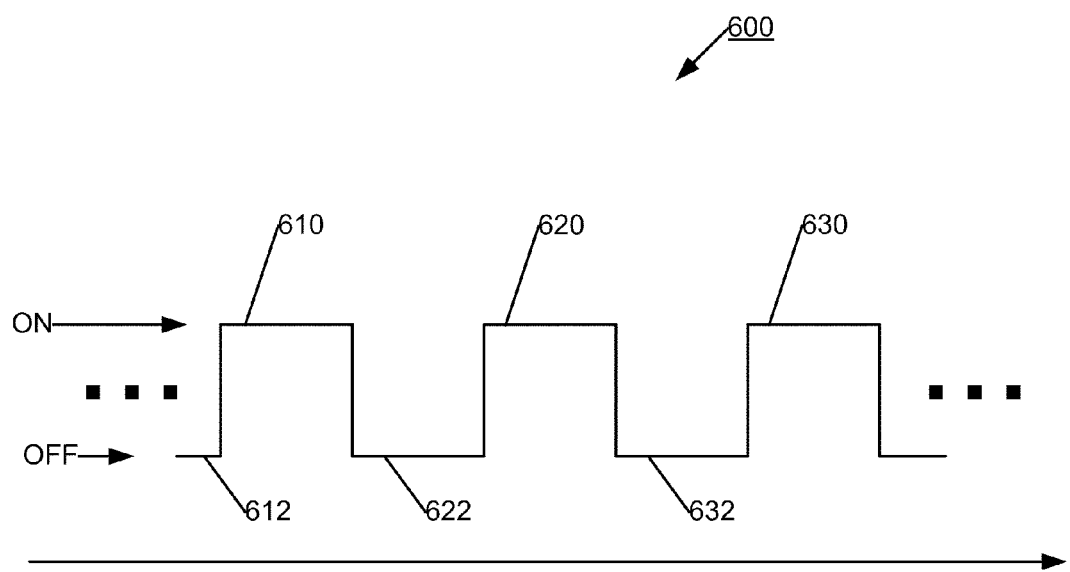
FIG. 6 is a diagram illustrating a typical gated trigger as used in different embodiments.

FIG. 6 is a diagram illustrating a typical gated trigger signal 600 as used in several embodiments. Such gated triggers are well known. As shown, a signal has high states 610, 620, 630, and low states 612, 622, 632, corresponding respectively to ON and OFF states. An example use of a gated trigger is as an ON/OFF cycle control of a light source such as a strobe light.

Figure 7:
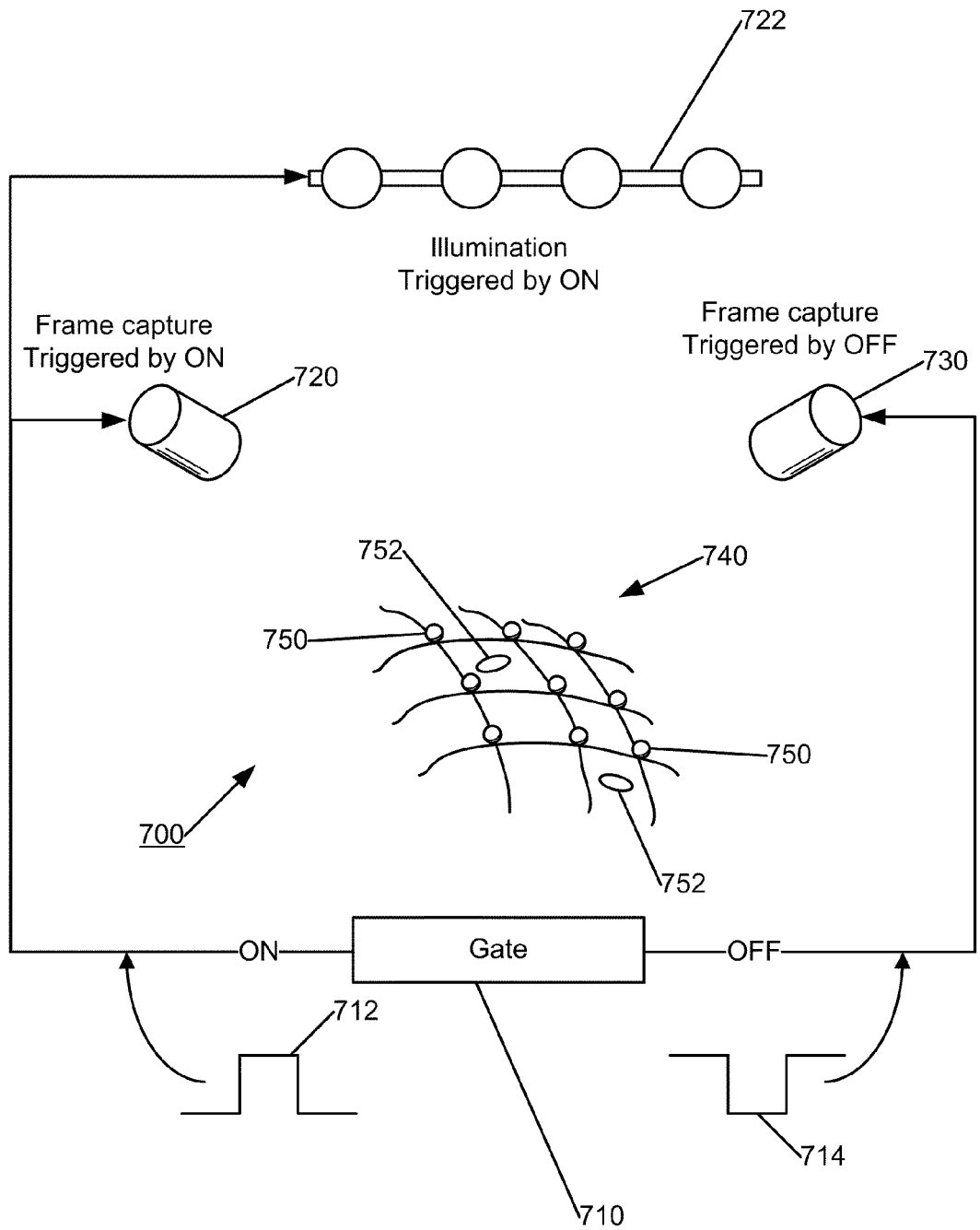
FIG. 7 is a diagram illustrating a capture space with a gated light source and two synchronized, gated motion capture cameras, one capturing primary marker data and the other capturing secondary marker data points according to one embodiment.

FIG. 7 is a diagram depicting a capture space 700 with a gated light source and two synchronized, gated motion capture cameras 720, 730, one camera 720 to capture primary marker data points and the other camera 730 to capture secondary marker signatures according to an embodiment. In an alternative embodiment, both cameras 720, 730 can be used to capture both primary marker data points and secondary marker signatures.

In the illustrated embodiment of FIG. 7, a gate 710 supplies a first gated signal 712 and a second gated signal 714. The first gated signal 712 triggers in an opposite phase to the second gated signal 714. The first gated signal 712 triggers a first motion capture camera 720 and an illumination source 722. Thus, when the first gated signal 712 reaches an ON state, the illumination source 722 is turned on for the length of an ON half-cycle, and the first motion capture camera 720 captures an image frame of the capture space 700. While the first gated signal 712 is in the ON state, the second gated signal 714 is in an OFF state, and thus the second motion capture camera 730, which the signal 714 triggers, is in an OFF state. The states reverse when the gated signal progresses one-half cycle. The first gated signal 712 transitions to an OFF state, putting the illumination source 722 and the first motion capture camera 720 in OFF states. The second gated signal 714 transitions to an ON state and triggers the second motion capture camera 730 to capture an image frame of the capture space 700. Thus, the first motion capture camera 720 captures image frames when the capture space 700 is illuminated and the second motion capture camera 730 captures image frames when the capture space is not illuminated.

In one embodiment, the target 740 has coupled to it small reflective spheres 750 constituting primary markers (nine are shown, two are indexed), and glow-in-the-dark patches 752 constituting secondary markers. For ease of illustration, the secondary markers 752 shown in FIG. 7 appear identical visually, but it will be recalled that secondary markers are by definition substantially uniquely identifiable. In this example, the glow-in-the-dark secondary markers can express unique signatures through the use of various shapes, colors, and luminous intensities, and further contain a visible pattern such as a bar code.

Referring to the embodiment illustrated in FIG. 7, when the first gated signal 712 is turned on, the illumination source 722 is triggered on and illuminates the capture space 700, causing the reflective spheres 750 to reflect small, bright points of light in the capture space 700. The first motion camera 720 is also triggered on at the same time and thus captures the bright points of light in an image frame. The first motion capture camera 720 thus captures the primary marker data points described above. When the first gated signal 712 and second gated signal 714 reverse states at the next half-cycle, the illumination is turned off. With no illumination, the reflective spheres are dark, but the glow-in-the-dark secondary markers 752 glow visibly. The second motion capture camera 730 is simultaneously trigger to an ON state during this half-cycle and so captures an image frame including the secondary markers 752 glowing in the now darkened capture space 700. That is, the second motion capture camera captures the signatures (e.g., glow) of the secondary markers 752. Thus, the two sequences of image frames captured by the first and second motion capture cameras 720, 730 together constitute a sequence of alternating frames including primary marker data points and secondary marker signatures. In one implementation, this motion capture sequence is then processed according to a method such as the method illustrated in FIG. 3(b).

Figure 8:
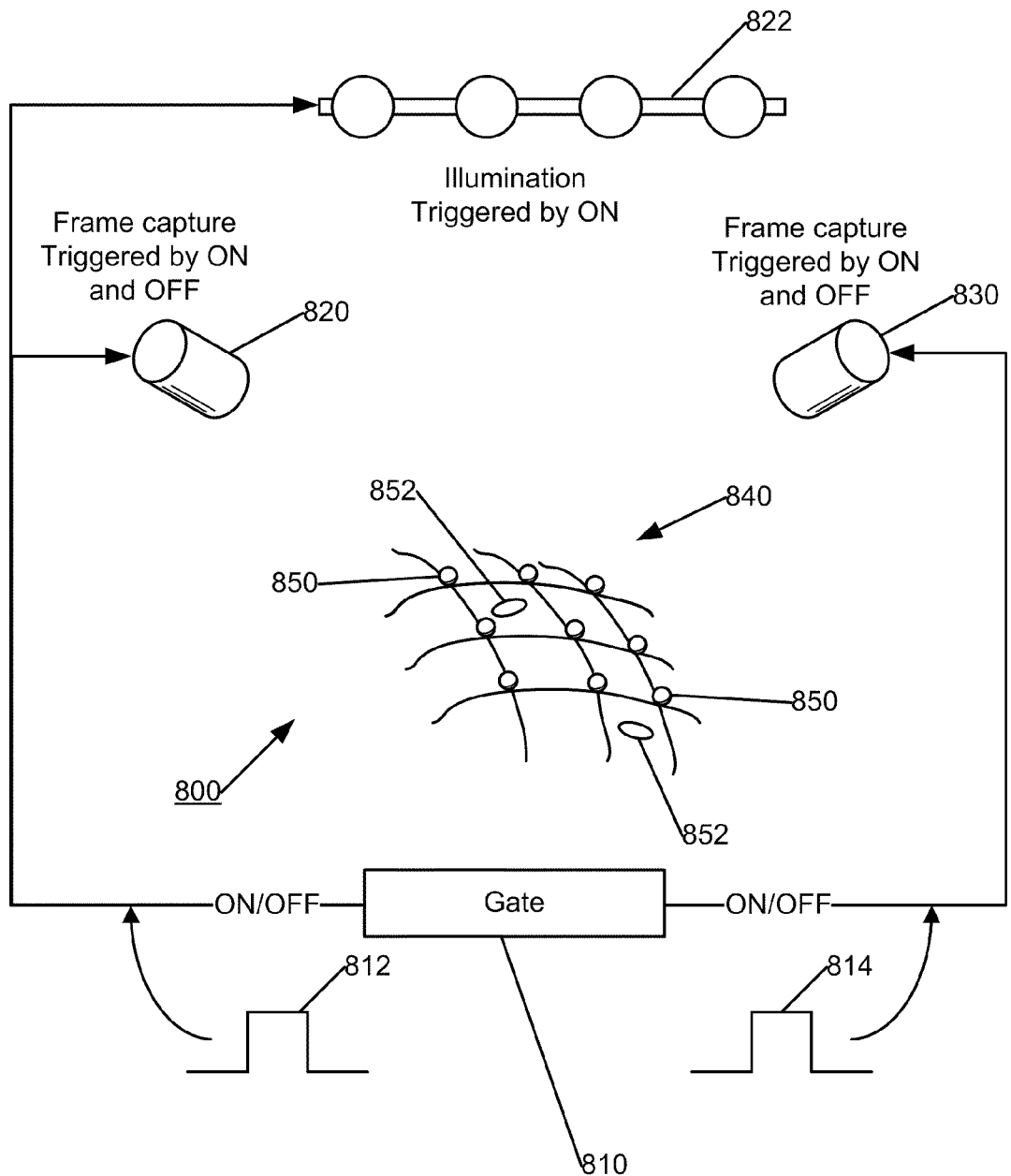
FIG. 8 is a diagram illustrating a capture space with a gated light source and two synchronized, gated motion capture cameras, both synchronously capturing primary marker data and secondary marker data points according to one embodiment.

FIG. 8 is a diagram depicting a capture space 800 with a gated light source and two synchronized, gated motion capture cameras 820, 830, where both cameras synchronously capture primary marker data points and secondary marker signatures according to one embodiment. As shown in FIG. 8, a gate 810 supplies a first gated signal 812 and a second gated signal 814. Contrasting with the embodiment illustrated in FIG. 7, the second gated signal 814 in this implementation is in the same phase as the first gated signal 812. Further, motion capture cameras 820, 830 are triggered to capture image frames at both ON and OFF states of the first and second gated signals 812, 814. As before, the first gated signal 812 triggers an illumination source 822 only during the ON state. Thus, when the first gated signal 812 reaches an ON state, the illumination source 822 is turned on for the length of the ON half-cycle, and the first and second motion capture cameras 820, 830 both capture an image frame of the illuminated capture space 800. When the first and second gated signals 812, 814 transition to an OFF state, the illumination source 822 is turned off for the length of the OFF half-cycle, and the first and second motion capture cameras 820, 830 both capture an image frame of the darkened capture space 800. That is, the first and second gated signals 812, 814 are synchronized in phase, causing the first and second motion capture cameras 820, 830 to operate in unison. Both motion capture cameras 820, 830 thus capture an frame sequence of alternating illuminated and darkened views of the capture space 800.

In one embodiment of the present invention, the target 840 has coupled to it small reflective spheres 850 constituting primary markers, and glow-in-the-dark patches 852 constituting the secondary markers. For ease of illustration, the secondary markers 852 illustrated in FIG. 8 appear visually identical, but it will be recalled that secondary markers are typically substantially uniquely identifiable. In this example, similar to one presented in relation to FIG. 7, the glow-in-the-dark secondary markers may express unique signatures through various shapes, colors, illumination intensities, or contain a visible pattern such as a bar code.

In the illustrated embodiment of FIG. 8, when the first and second gated signals 812, 814 are transitioned on, the illumination source 822 is triggered on and illuminates the capture space 800. This causes the reflective spheres 850 to reflect small, bright points of light in the capture space 800. The first and second motion capture cameras 820, 830 are also triggered on at the same time and thus capture the bright points of light in respective image frames. That is, the first and second motion capture cameras 820, 830 capture the primary marker data points described above. When the first and second gated signals reverse states at the next half-cycle, the illumination source 822 is turned off. With no illumination, the reflective spheres 850 are dark, but the glow-in-the-dark secondary markers 852 glow visibly. The first and second motion capture cameras 820, 830 are simultaneously triggered by the OFF state during this half-cycle and so capture another image frame, this time capturing the signatures of secondary markers 852 visible in the now darkened capture space 800. That is, the first and second motion capture cameras 820, 830 both capture sequences of alternating frames including primary marker data points and secondary marker signatures. In one implementation, this sequence is then processed according to a method such as the method illustrated in FIG. 3(*a*).

Various illustrative implementations of the present invention have been described. However, one of ordinary skill in the art will recognize that additional implementations are also possible and within the scope of the present invention. For example, in one variation, different methods may be used to associate primary marker data points with secondary marker signatures using one-to-one, one-to-many, and many-to-one relations between the two data sets. Further, various combinations of the systems depicted in FIGS. 7 and 8 may address different needs of the user.

Accordingly, the present invention is not limited to only those implementations described above.

What is claimed is:

1. A method, comprising:
    capturing a plurality of primary marker data points from a plurality of primary markers attached to a target,
    wherein each primary marker data point corresponds to one primary marker of said plurality of primary markers;
    capturing at least one secondary marker signature from at least one secondary marker attached to the target, each secondary marker signature corresponding to and uniquely identifying each secondary marker of said at least one secondary marker;
    associating the at least one secondary marker signature with at least one primary marker data point of the plurality of primary marker data points; and
    identifying said plurality of primary markers using the plurality of primary marker data points relative to at least one active marker characteristics of the at least one secondary marker obtained from said at least one associated secondary marker signature.

2. The method of claim 1, wherein said capturing a plurality of primary marker data points includes:
    illuminating said plurality of primary markers; and
    capturing a response of said plurality of primary markers to said illumination.

3. The method of claim 2, wherein:
    said plurality of primary markers includes a plurality of reflective markers; and
    said response includes a reflection of said illumination by said plurality of reflective markers.

4. The method of claim 1, wherein said capturing at least one secondary marker signature includes
    capturing a unique attribute of said at least one secondary marker.

5. The method of claim 4, wherein said unique attribute is shape.

6. The method of claim 4, wherein said unique attribute is color.

7. The method of claim 4, wherein said unique attribute is an electro-magnetic signature.

8. The method of claim 4, wherein said unique attribute is a radio frequency signature.

9. The method of claim 4, wherein said unique attribute is a bar code.

10. The method of claim 3, wherein:
    said illumination is subject to periodic gating to generate on-states and off-states of said illumination;
    said reflection of said illumination is captured during an on-state of said illumination; and
    said unique attribute is captured during an off-state of said illumination.

11. The method of claim 10, wherein:
    said reflection of said illumination captured during the on-state is captured from light markers; and
    said unique attribute captured during the off-state is captured from dark markers.

12. The method of claim 11, wherein:
    at least one sensor captures said reflection of said illumination and said unique attribute; and
    said at least one sensor is synchronized with said periodic gating so that said at least one sensor captures a frame of data from said light markers during said on-state and a frame of data from said dark markers during said off-state.

13. The method of claim 12, wherein said at least one sensor includes at least one motion capture camera.

14. The method of claim 12, wherein:
    a first sensor of said at least one sensor is synchronized with said periodic gating to capture said reflection of said illumination during each on-state of said on-states; and
    a second sensor of said at least one sensor is synchronized with said periodic gating to capture said unique attribute during each off-state of said off-states.

15. The method of claim 14, wherein:
    said first sensor includes a first motion capture camera configured to capture said reflection from said plurality of reflective markers; and
    said second sensor includes a second motion capture camera configured to capture said unique attribute.

16. The method of claim 10, where in said illumination is generated by a strobe light.

17. A system, comprising:
an image capture module configured to capture a plurality of primary marker data points from a plurality of primary markers attached to a target, each primary marker data point corresponding to one primary marker of said plurality of primary markers,
said image capture module also configured to capture at least one secondary marker signature from at least one secondary marker attached to the target, each secondary marker signature corresponding to and uniquely identifying each secondary marker of said at least one secondary marker; and
a primary marker tracking module configured:
to associate the at least one secondary marker signature with at least one primary marker data point of the plurality of primary marker data points;
to identify said plurality of primary markers using the plurality of primary marker data points relative to at least one active marker characteristics of the at least one secondary marker obtained from said at least one associated secondary marker signature.

18. The system of claim 17, wherein said at least one secondary marker includes a glow-in-the-dark marker.

19. The system of claim 17, wherein said plurality of primary markers includes a plurality of passive markers, and said at least one secondary marker includes at least one active marker.

20. The system of claim 17, wherein said plurality of primary markers includes a plurality of active markers, and said at least one secondary marker includes at least one passive marker.

21. The system of claim 20, wherein said plurality of active markers includes at least one of
an LED, an active RFID tag, a potentiometer, a data glove, an accelerometer, an externally-worn exoskeleton, and a sonic-chirp emitter.

22. The system of claim 20, wherein said at least one passive marker includes at least one of
a passive RFID tag, a glow-in-the-dark patch, a shape tape, and an electro-magnetic tag.

23. The system of claim 17, further comprising
a digital modeling module configured to generate a system of vertices in a virtual space including a modeled surface representing said target.

24. A tangible storage medium storing a computer program for capturing the motion of a target, the program comprising executable instructions that cause a computer to:
capture a plurality of primary marker data points from a plurality of primary markers attached to a target, each primary marker data point corresponding to one primary marker of the plurality of primary markers;
capture at least one secondary marker signature from at least one secondary marker attached to the target, each secondary marker signature corresponding to and uniquely identifying each secondary marker of the at least one secondary marker;
associate the at least one secondary marker signature with at least one primary marker data point of the plurality of primary marker data points; and
identify said plurality of primary markers using the plurality of primary marker data points relative to at least one active marker characteristics of the at least one secondary marker obtained from said at least one associated secondary marker signature.

25. An apparatus comprising:
means for capturing a plurality of primary marker data points from a plurality of primary markers attached to a target, each primary marker data point corresponding to one primary marker of the plurality of primary markers;
means for capturing at least one secondary marker signature from at least one secondary marker attached to the target, each secondary marker signature corresponding to and uniquely identifying each secondary marker of at least one secondary marker coupled to said target;
means for associating the at least one secondary marker signature with at least one primary marker data point of the plurality of primary marker data points; and
means for identifying said plurality of primary markers using the plurality of primary marker data points relative to at least one active marker characteristics of the at least one secondary marker obtained from said at least one associated secondary marker signature.

26. The method of claim 1, wherein the at least one active marker characteristics of the at least one secondary marker include
a position of the at least one secondary marker indicated by the at least one secondary marker signature.

27. The method of claim 1, wherein the at least one active marker characteristics of the at least one secondary marker include
a spatial pattern made by the at least one secondary marker, and indicated by the at least one secondary marker signature.

28. A method, comprising:
capturing a plurality of primary marker data points from a plurality of primary markers attached to a target including illuminating the plurality of primary markers and capturing a response of the plurality of primary markers to the illumination,
wherein each primary marker data point corresponds to one primary marker of the plurality of primary markers,
wherein the plurality of primary markers includes a plurality of reflective markers and the response includes a reflection of said illumination by the plurality of reflective markers,
wherein the illumination is subject to periodic gating to generate on-states and off-states of the illumination,
wherein the reflection of the illumination is captured during an on-state of the illumination, and
wherein the unique attribute is captured during an off-state of the illumination;
capturing at least one secondary marker signature from at least one secondary marker attached to the target, each secondary marker signature corresponding to and uniquely identifying each secondary marker of said at least one secondary marker; and
identifying said plurality of primary markers using the plurality of primary marker data points relative to at least one active marker characteristics of the at least one secondary marker obtained from said at least one secondary marker signature.

29. The method of claim 28, wherein:
said reflection of said illumination captured during the on-state is captured from light markers; and
said unique attribute captured during the off-state is captured from dark markers.

30. The method of claim 29, wherein:
at least one sensor captures said reflection of said illumination and said unique attribute; and
said at least one sensor is synchronized with said periodic gating so that said at least one sensor captures a frame of data from said light markers during said on-state and a frame of data from said dark markers during said off-state.

31. The method of claim 30, wherein said at least one sensor includes at least one motion capture camera.

32. The method of claim 30, wherein:
a first sensor of said at least one sensor is synchronized with said periodic gating to capture said reflection of said illumination during each on-state of said on-states; and
a second sensor of said at least one sensor is synchronized with said periodic gating to capture said unique attribute during each off-state of said off-states.

33. The method of claim 32, wherein:
said first sensor includes a first motion capture camera configured to capture said reflection from said plurality of reflective markers; and
said second sensor includes a second motion capture camera configured to capture said unique attribute.

34. The method of claim 28, where in said illumination is generated by a strobe light.

* * * * *